United States Patent [19]

Marchioro

[11] 4,291,446
[45] Sep. 29, 1981

[54] CONTROLLED DEFLECTION ROLL

[75] Inventor: Ignazio Marchioro, Schio, Italy

[73] Assignee: Escher Wyss Aktiengesellschaft, Zurich, Switzerland

[21] Appl. No.: 87,092

[22] Filed: Oct. 22, 1979

[30] Foreign Application Priority Data

Oct. 31, 1978 [CH] Switzerland ............ 11193/78

[51] Int. Cl.³ .............................. B21B 13/02
[52] U.S. Cl. ................................. 29/116 AD
[58] Field of Search ...... 29/116 AD, 113 AD, 116 R, 29/113 R; 100/162 B, 170

[56] References Cited
U.S. PATENT DOCUMENTS 4,106,405  8/1978  Biondetti et al. ......... 29/116 AD X
4,183,128  1/1980  Marchioro .................. 29/116 AD

FOREIGN PATENT DOCUMENTS 2028203  3/1980  United Kingdom .......... 29/116 AD

*Primary Examiner*—Peter P. Nerbun
*Attorney, Agent, or Firm*—Werner W. Kleeman

[57] ABSTRACT

A controlled deflection roll comprising a stationary roll support and a roll shell rotatable about the stationary support. The roll shell is supported upon pressure or support elements which can be activated by pressurized fluid medium at different pressures. At the end of the stationary support there is arranged a supply head means containing pressure regulators, a common infeed line or conduit and outfeed channels, leading to the pressure or support elements. At the center of the supply head means there is formed a relief bore which is connected with the outfeed channels, provided with a slide and serves for the rapid lowering of the pressure which is effective at the pressure or support elements. The pressure regulators are arranged in a star-like configuration at the supply head means.

9 Claims, 6 Drawing Figures

CONTROLLED DEFLECTION ROLL

BACKGROUND OF THE INVENTION

The present invention relates to a new and improved construction of controlled deflection roll, also referred to in the art as a roll with bending or sag compensation.

Generally speaking, the controlled deflection roll of the present development is of the type comprising a stationary roll support and a roll shell which is rotatable about the stationary support. The roll shell is supported upon a plurality of pressure or support elements to which there is infed pressurized fluid medium at different pressures by means of flow channels located in the stationary support.

A controlled deflection roll of this type has become known to the art, for instance, from U.S. Pat. No. 3,802,044 and U.S. Pat. No. 3,885,283. If with such type controlled deflection roll there is infed pressurized fluid medium at different pressures to individual pressure or support elements or groups of such pressure or support elements, then heretofore this was accomplished, as a general rule, by a supply unit containing pumps and regulating valves, arranged at the region of the controlled deflection roll. The supply unit was connected with appropriate pipe lines or conduits with the stationary roll support of the controlled deflection roll. Also, in this technology, it has been proposed to secure pressure regulating valves individually at the end of the stationary roll support. However, when doing so, frequently difficulties arose in terms of adequate space for the regulators. These difficulties were intensified as, consistent with the proposals made in German Patent No. 2,632,452, a slide for rapid relief of the controlled deflection roll was arranged at the end of the stationary support i.e. for opening the outflow of the pressurized fluid medium.

SUMMARY OF THE INVENTION

Therefore, with the foregoing in mind, it is a primary object of the present invention to provide a new and improved construction of controlled deflection roll which is not associated with the aforementioned drawbacks and limitations of the prior art proposals.

Another and more specific object of the present invention aims at the provision of a new and improved construction of a controlled deflection roll of the previously mentioned type, wherein such difficulties are overcome, especially when working with a number of pressure zones of a controlled deflection roll, i.e., a plurality of pressure regulators, and there is realized furthermore an appreciable simplification of the fluid circuit, especially as concerns the possibility of rapidly pressure relieving the pressure or support elements.

Now in order to implement these and still further objects of the invention, which will become more readily apparent as the description proceeds, the controlled deflection roll of the present development is manifested by the features that at the end of the stationary support, protruding out of the roll shell, there is secured a supply head or supply head means. This supply head means contains pressure regulators, operatively associated with the individual flow channels in the stationary roll support, a common distributor line or conduit for the pressurized fluid medium infed to the regulators, the distributor line being connectable with an infeed line or conduit, and further contains connection bores leading from the individual regulators to the therewith operatively associated flow channels in the stationary support. In this way there is realized a separate unit or component which, as required, can be dismantled from the roll support or again mounted thereat. For the dismantling work it is only necessary to disconnect a minimum number of lines or conduits and it is no longer possible to mix up or confuse the lines or conduits leading from the individual regulators to their pressure or support elements.

A particular advantage is realized if each connection bore is provided with a communication bore opening into a common pressure relief bore which, in turn, is connected with an outflow channel for the medium. The mouths or openings of the communication bores can be closed by a shutoff slide movable in the relief bore. In this way, there is obtained in the same unit, with the aid of the shortest possible lines or conduits, a central rapid pressure relief arrangement, and specifically, with appreciably simpler means than was heretofore possible.

Preferably, the supply head means can be intended for attachment at a likewise ring-shaped end surface of the stationary support. The pressure regulators are arranged in a star-like configuration at the supply head means, the relief bore is arranged at the central region of the supply head means between the pressure regulators, and the communication bores leading from the connection bores likewise open therein in a star-like shaped configuration. In this way there is obtained a particularly compact and space-saving construction of the supply head means, which is also especially favorable as concerns its attachment at the stationary roll support.

The shutoff slide can be connected with an actuation piston movable in a cylindrical bore of the supply head means, this cylindrical bore being arranged essentially coaxially with respect to the pressure relief bore, and enabling actuation of the shutoff slide by a pressurized fluid medium. Consequently, there is realized the possibility of remote control of the slide by pressurized oil or compressed air. However, it also should be understood that the slide can also be actuated in a different way, for instance electromagnetically.

Each of the connection bores can be equipped with an outwardly extending branch bore, at which there can be connected a manometer. With the aid of the manometer there is possible an adjustment of the regulator to the desired pressure.

In the bore leading from the relief bore to the outflow channel there can be arranged an adjustable throttle element. With the aid of this throttle element it is possible to regulate the speed of the lift-off movement of the roll shell during rapid pressure relief.

The supply head means can be attached at the stationary support with the aid of a part which encloses the end of the stationary support. This part bears against a split ring which is inserted into a groove of the stationary support. The part encircling the end of the stationary support simultaneously can constitute an outflow connection or stud for the medium.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
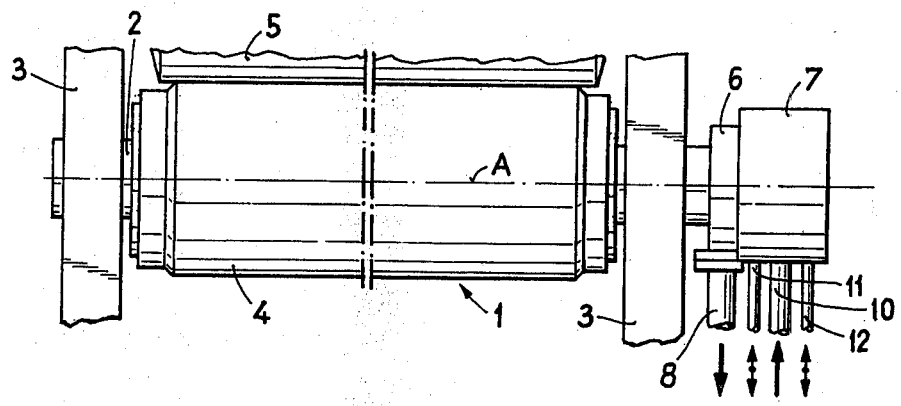
FIG. 1 is a schematic front view of a controlled deflection roll according to the invention.

Describing now the drawings, in FIG. 1 there is shown a controlled deflection roll 1, constructed according to the invention, which will be seen to comprise a stationary roll support 2 which is supported in side elements or plates 3 if a conventional frame of a suitable rolling or roller mill or the like. A roll shell 4 is movably mounted with respect to the stationary support 2, for instance as disclosed in the aforementioned U.S. Pat. No. 3,885,283 and the German Pat. No. 2,632,452, to which reference may be readily had and the disclosure of which is incorporated herein by reference, and can be pressed by suitable pressure or support elements, as is well known in the art and from such patents, against a counter roll 5. At the right-hand end of the stationary roll support 2 there is attached an outflow connection or stud 6 for the hydraulic medium, for instance oil, as well as a supply head or supply head means 7. Merging with the outflow connection 6, constituting a part which for instance encircles the related end of the roll support 2, is an outflow line or conduit 8. The supply head means 7 is connected with a supply line or conduit 10 of the hydraulic pressurized fluid medium and with two control lines or conduits 11 and 12 for the rapid pressure relief.

Figure 6:
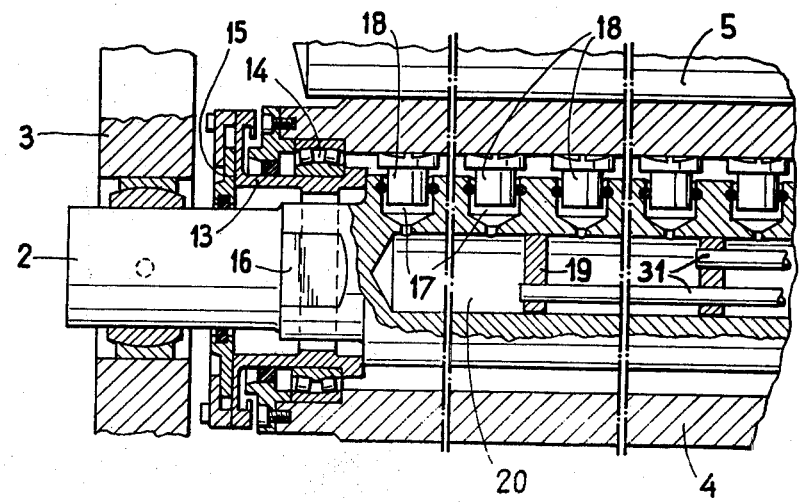
FIG. 6 is a fragmentary view of the arrangement of FIG. 1 on an enlarged scale and in sectional showing.

FIG. 6 shows a known construction of the pressure or support elements and the guiding of the roll shell, the illustration being a sectional view of part of the arrangement of FIG. 1 and on an enlarged scale. By reverting to FIG. 6 it will be recognized that the roll shell 4 is mounted upon guide bushings 13 with the aid of roller bearings 14. These guide bushings or sleeves 13 are provided at their ends with end closures or cover members 15. At the stationary support 2 there are formed substantially flat or planar guide surfaces 16 which extend parallel to the pressure or contact direction, along which there are guided appropriate guide surfaces of the guide bushing 13, likewise as is known in this technology.

As also best seen by referring to FIG. 6, pressure or support elements 18, here shown by way of example as piston-like pressure or support elements, are guided in suitable bores 17 in the stationary support 2. The pressure or support elements 18 are subjected to the action of a suitable hydraulic pressurized fluid medium which is effective in a bore 20. This bore 20 extends through the entire stationary support 2 and is subdivided into different sections or portions where there can prevail, as desired, the same or different pressures.

Figure 2:
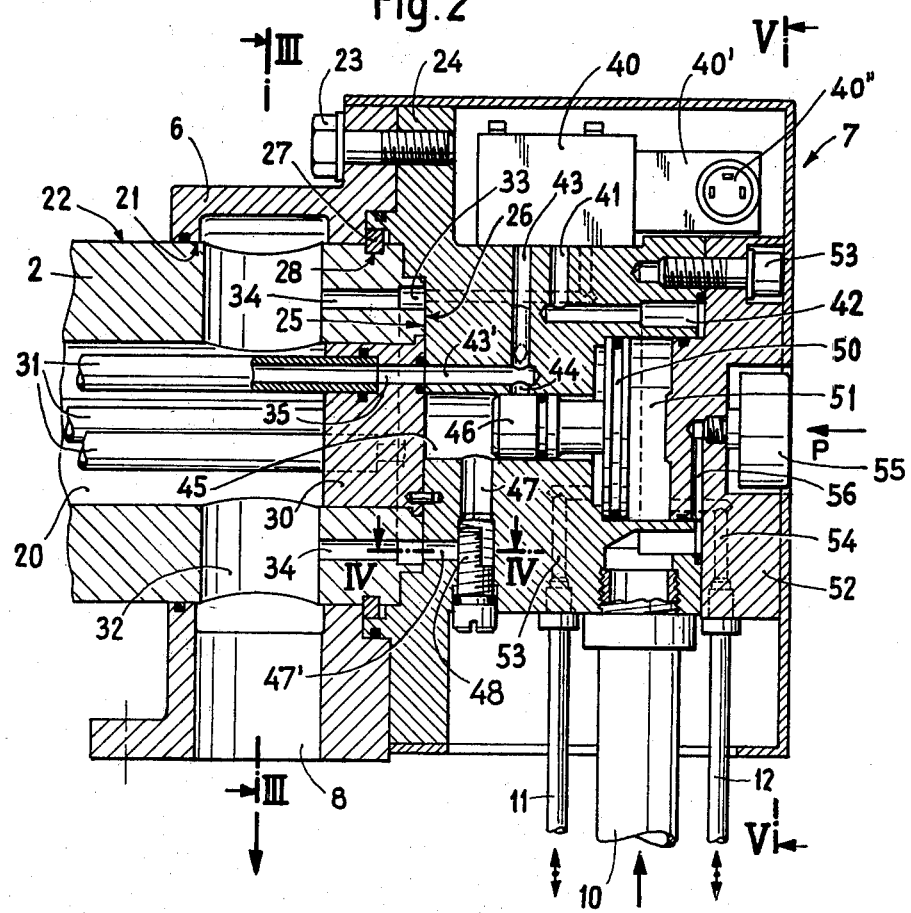
FIG. 2 is a schematic sectional view of the right-hand end of the controlled deflection roll of FIG. 1 showing details of the supply head or supply head means and the outflow connections or studs.

FIG. 2 illustrates the outflow connection 6 and the supply head means 7 in sectional view. The outflow or discharge connection 6 will be seen to contain a bore 21 which sealingly encloses a substantially cylindrical surface 22 of the stationary support 2. At the outflow connection 6 there is attached, for instance by means of threaded bolts or screws 23 or equivalent fastening means, a body portion 24 of the supply head means 7. This body portion 24 bears by means of a substantially ring-shaped flat surface 25 against an equally configured surface 26 which is formed at the end face of the stationary support 2. The outflow connection 6 bears, on the one hand, against a two-part ring 27 which is inserted into a groove 28 at the end of the stationary support 2.

As further seen by referring to FIG. 2, the bore 20 of the stationary support 2 is closed at its right-hand end by a closure or cover member 30. Mounted sealingly in the cover member 30 are the ends of tubes 31 defining flow channels and which lead to the previously mentioned sections of the bore 20 and can have different pressures. The bore 20 is subdivided for this purpose by partition or separation walls 19.

The last section or portion of the bore 20 serves for the outflow of the hydraulic medium, here assumed to be oil, from the inner space of the controlled deflection roll, and, for this purpose, is provided with a transverse bore 32 which opens into the outflow connection 6.

Additionally, the end surface 26 of the stationary support 2 is provided with a substantially ring-shaped collecting groove 33 from which bores 34 lead into the transverse bore 32. At the cover member 30 there are formed bores 35 which merge with the tubes or pipes 31 at the supply head means 7.

Figure 5:
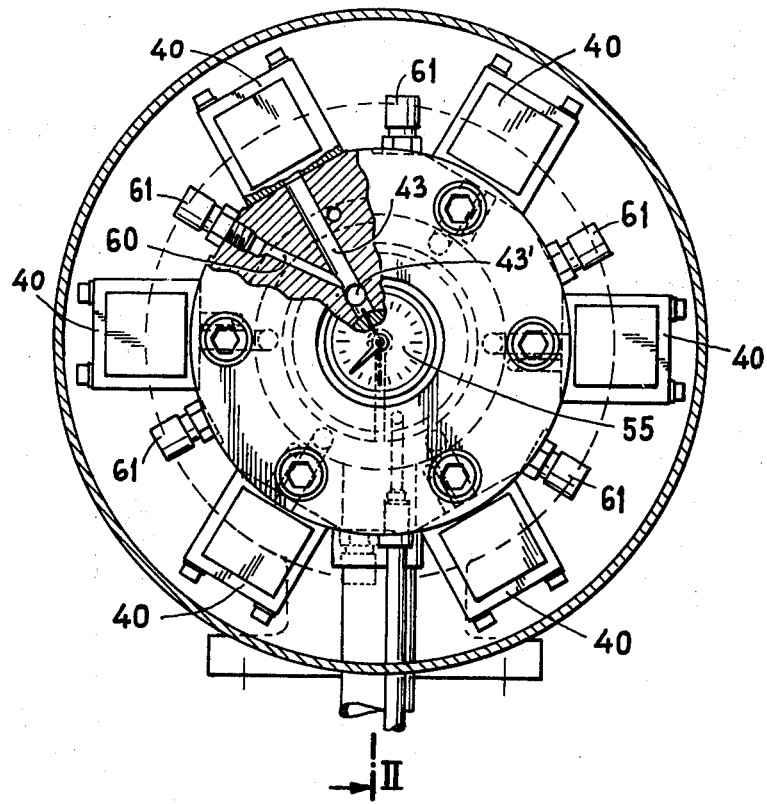
FIG. 5 is an end view, looking in the direction of the arrow P of FIG. 2, partially in section.

As best seen by referring to FIGS. 2 and 5, there are arranged in the supply head means 7 in a star-shaped configuration pressure regulators 40 which are connected, by means of the bores 41, at a common ring-shaped distributor channel or duct 42. The distributor channel 42 flow communicates, in turn, with the supply line or conduit 10. The outlets of the pressure regulators 40 are connected by the connection bores 43, 43' with the bores 35 in the cover member 30, and thus, with the related conduit or tube 31 leading to the related section of the bore 20.

Figure 3:
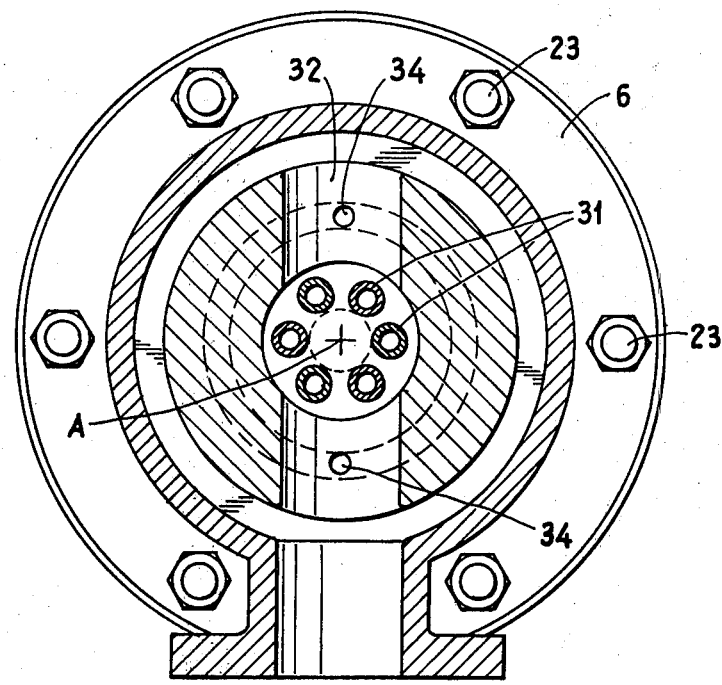
FIG. 3 is a sectional view of the arrangement of FIG. 2, taken substantially along the section line III—III thereof.
Figure 4:
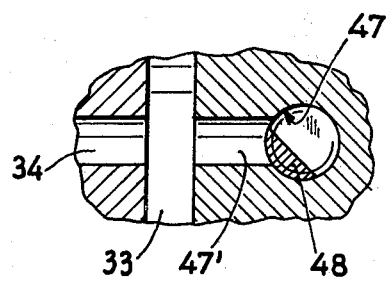
FIG. 4 is a fragmentary sectional view of the arrangement of FIG. 2, taken substantially along the section line IV—IV thereof.

As will be observed by referring to FIG. 3, the tubes or conduits 31 are arranged in a circular array about the lengthwise axis A of the stationary roll support 3. The bores 43 lead from the star-shaped arranged pressure regulators 40 essentially radially towards the inside and then continue through axially extending bore sections or portions 43' to the bores 35. At the same time short communication or connection bores 44, leading from the bores 43 or their sections 43', as the case may be, lead to a common central pressure relief bore 45. For reasons of clarity and simplification in illustration, there has only been shown one of the communication or connection bores 44 and its mouth or opening at the central relief bore 45. The remaining communication or connection bores 44 open into the relief bore 45 in a plane perpendicular to the axis A of the roll support 2, and therefore, can be conjointly closed by a shutoff slide 46 which is movable within the relief bore 45. The relief bore 45 is connected by means of the bores 47, 47' with a collecting channel 33, the bore 34, the transverse bore 32, and thus, with the outflow line or conduit 8. The opening or mouth of the bore 47' merging with the bore 47 is partially closable by a rotatable throttle slide 48, or equivalent structure, as best seen by referring to FIG. 4.

As also apparent by referring to FIG. 2, the shutoff slide 46 is connected with an actuation piston 50 or equivalent actuation element, which is sealingly guided in a cylindrical bore or chamber 51, formed in the part 24, this cylindrical bore 51 being essentially coaxially arranged with respect to the relief bore 45. The cylinder bore 51 is closed at its right-hand end by a cover or closure member 52 which is attached at part 24 by means of threaded bolts or screws 53 or equivalent fastening devices. The previously mentioned control lines 11 and 12 lead to the cylinder spaces of the cylinder or bore 51, located at both sides of the piston 50, and specifically, by means of the bores 53 and 54.

As also readily apparent by referring to FIGS. 2 and 5, it is possible to arrange at the cover member 52 a manometer 55, which can be connected by a channel 56 with the common distributor channel or line 42, and thus, serves for measuring the pressure prevailing in the supply line or conduit 10.

The pressure regulators 40, illustrated in FIG. 2, are provided with standard electromagnetic actuation elements 40' having connection bushings or sleeves 40" for electrical control lines.

It should be understood however that in the same manner it is also possible to employ, for instance, pneumatic regulating valves having pneumatic control lines.

During operation, the pressurized fluid medium is infed through the supply line or conduit 10 to the pressure regulators 40 and from the latter is further delivered, at the pressures regulated by such pressure regulators 40 to the tubes or pipes 31. If there is desired a rapid pressure relief of the controlled deflection roll, for instance if there is desired a sudden opening of the rolling mill, then the control line 53 is pressurized and the line 54 is relieved. The shutoff slide 46 is moved, in the showing of FIG. 2, towards the right and frees the mouths or openings of the bores 44. The medium infed by the regulators 40 now can outflow through the relief bore 45 into the outflow line or conduit 8. At the same time it is also possible for the pressurized medium, located in the bores 17 of the stationary support 2, to flow back through the pipes or tubes 31 and to outflow through the outflow or discharge line.

The rotational or rotary slide 48 serves for throttling the outflow of the hydraulic medium in the outflow or discharge line 8 and thus, for regulating the speed with which the roll shell 4 moves during the pressure or load relief motion.

As will be apparent from the showing of FIG. 5, the connection bores 43, 43', leading from the pressure regulators 40 to the pipes or tubes 31, are each equipped with a branch bore 60, closable by means of a threaded cap 61 or equivalent structure and serving for the connection of a manometer for the setting of the pressure regulators.

While there are shown and described present preferred embodiments of the invention, it is to be be distinctly understood that the invention is not limited thereto, but may be otherwise variously embodied and practised within the scope of the following claims. Accordingly,

What I claim is:
1. A controlled deflection roll comprising:
   a stationary roll support;
   a roll shell rotatable about said stationary roll support;
   means for mounting said roll shell to be rotatable about said stationary roll support;
   a plurality of pressure elements upon which there is supported said rotatable roll shell;
   said roll support having flow channels through which there is infed pressurized fluid medium at different pressures;
   said roll support having an end protruding out of said roll shell;
   supply head means releasably secured to said protruding end of said roll support;
   means for releasably securing said supply head means at said protruding end of said roll support;
   said supply head means containing pressure regulators operatively associated with the individual flow channels in the roll support, a common distributor line for the pressurized fluid medium infed to the pressure regulators, and connection bores;
   infeed line means with which there is connectable said common distributor line; and
   said connection bores leading from the individual pressure regulators to the related flow channels in the roll support.

2. The controlled deflection roll as defined in claim 1, wherein:
   each connection bore is provided with a related communication bore;
   a common relief bore into which opens said communication bore;
   an outflow channel means for the pressurized fluid medium;
   said common relief bore being connected with said outflow channel means;
   each of said communication bores having mouth means; and
   a shutoff slide movable in said relief bore for closing said mouth means of said communication bores.

3. The controlled deflection roll as defined in claim 1, wherein:
   said roll support has a substantially flat ring-shaped end surface;
   said supply head means being attachable to said flat, ring-shaped end surface of said roll support;
   said pressure regulators being arranged in a substantially star-shaped configuration at said supply head means;
   said relief bore being arranged at the central region of the supply head means between said pressure regulators; and
   the communication bores leading from the connection bores opening in a substantially star-like configuration into the relief bore.

4. The controlled deflection roll as defined in claim 2, further including:
   an actuation piston with which there is operatively connected said shutoff slide;
   said supply head means having a cylindrical bore arranged coaxially with respect to said relief bore; and
   said actuation piston being movable in said coaxial cylindrical bore and enables actuation of the shutoff slide by a pressurized fluid medium.

5. The controlled deflection roll as defined in claim 1, wherein:
   each of the connection bores is provided with an outwardly extending branch bore with which there can be connected a manometer.

6. The controlled deflection roll as defined in claim 1, further including:
   outflow channel means for the pressurized fluid medium;
   bore means leading from the relief bore to the outflow channel means; and
   an adjustable throttle element arranged in said bore means leading from said relief bore to said outflow channel means.

7. The controlled deflection roll as defined in claim 3, further including:
   means encircling the end of the roll support and serving for the attachment of the supply head means at the roll support;
   a split ring against which bears said encircling means; and
   said roll support having groove means in which there is inserted said split ring.

8. The controlled deflection roll as defined in claim 7, wherein:
   said means encircling the end of the roll support simultaneously forms an outflow connection means for the medium.

9. A controlled deflection roll comprising:
   a stationary roll support;
   a roll shell rotatable about said stationary roll support;
   means for mounting said roll shell to be rotatable about said stationary roll support;
   a plurality of pressure elements upon which there is supported said rotatable roll shell;
   said roll support having individual flow channels through which there is infed pressurized fluid medium at different pressures;
   said roll support having an end region;
   supply head means detachably secured to said end region of said roll support;
   said detachable supply head means containing therein:
      individual pressure regulators operatively associated with the individual flow channels in the roll support;
      a common distributor channel means for the pressurized fluid medium infed to the pressure regulators;
      a plurality of connection bores;
   infeed line means for the pressurized fluid medium with which there is connectable said common distributor channel means; and
   said connection bores leading from the individual pressure regulators to the related flow channels in the roll support.

* * * * *